United States Patent [19]
Kuhlmann

[11] 3,934,950
[45] Jan. 27, 1976

[54] BEARING FOR HIGH SPEED ROTARY SHAFTS

[75] Inventor: Wolf Kuhlmann, Schweinfurt, Germany

[73] Assignee: SKF Industrial Trading and Development Company, B.V., Amsterdam, Netherlands

[22] Filed: Oct. 3, 1973

[21] Appl. No.: 403,330

[30] Foreign Application Priority Data
Oct. 4, 1972 Germany............................ 2248695

[52] U.S. Cl....................................... 308/10; 57/93
[51] Int. Cl.² .......................................... F16C 39/00
[58] Field of Search ..................................... 308/10; 74/5–5.7; 73/472, 473; 57/77.45, 92, 93

[56] References Cited
UNITED STATES PATENTS

| | | | |
|---|---|---|---|
| 3,199,932 | 8/1965 | Clark | 308/10 |
| 3,393,334 | 7/1968 | Sundstrom | 308/10 |
| 3,428,371 | 2/1969 | Lyman | 308/10 |
| 3,473,852 | 10/1969 | Lyman | 308/10 |
| 3,493,275 | 2/1970 | Stone | 308/10 |
| 3,598,456 | 8/1971 | Love | 308/10 |
| 3,761,148 | 9/1973 | Grosbard | 308/10 |

*Primary Examiner*—R. Skudy

[57] ABSTRACT

System for journalling a high speed rotary shaft in which a spherical fluid dynamic cap bearing is adapted to receive an end of the shaft. A magnet arrayed in the vicinity of the cap exerting a force axially on the shaft. The shaft is provided with magnetic material cooperation with the magnet, so that that the shaft is drawn and/or pushed into the bearing.

16 Claims, 6 Drawing Figures

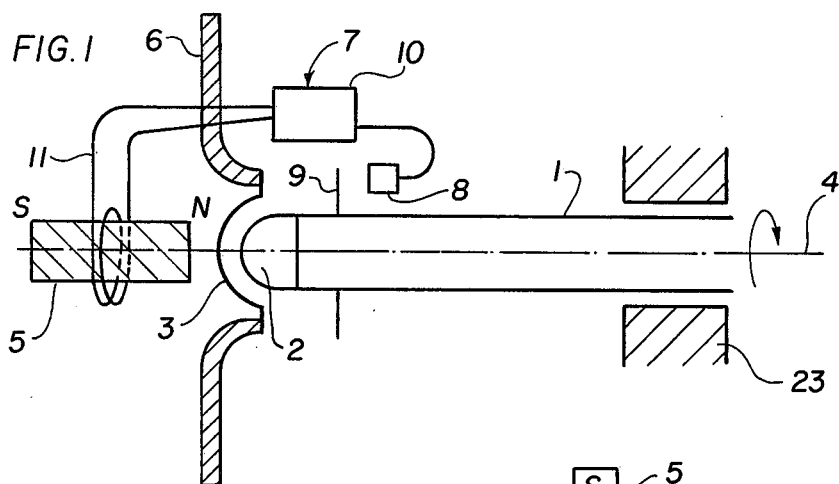
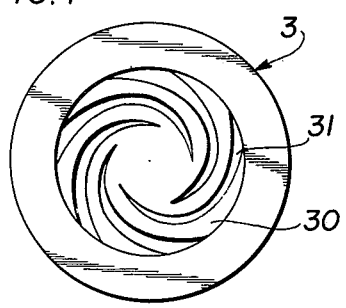
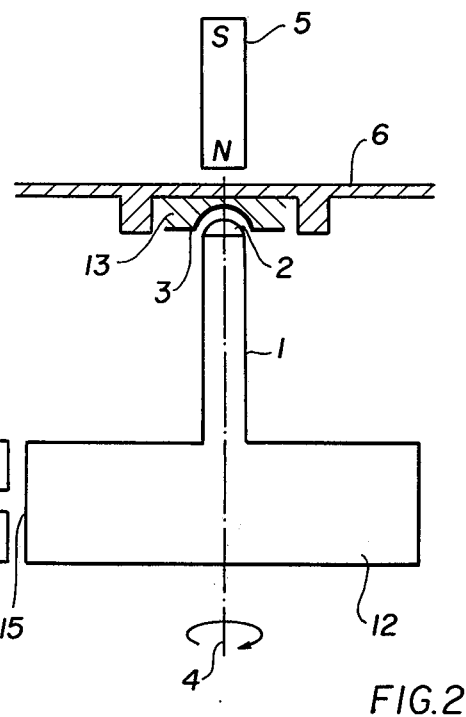
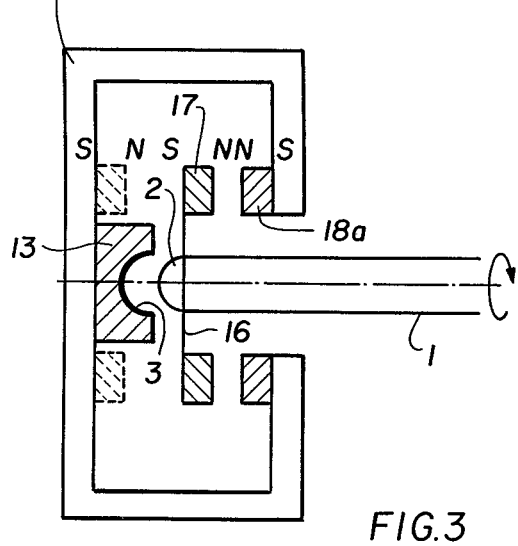
FIG. 1
FIG. 7
FIG. 2
FIG. 3

BEARING FOR HIGH SPEED ROTARY SHAFTS

BACKGROUND OF INVENTION

The present invention relates to bearings for journaling high speed rotating shafts and particularly for a fluid dynamic spiral groove cap bearing for shafts such as the shafts for rotors, centrifugers, spindles and the like.

Aerodynamic and hydrodynamic spherical cap bearings have been employed as plain axial bearings for journaling perpendicular shafts which in operation are adapted to run at an extremely high speed of rotation. Shafts on which are mounted centrifugers, yarn winding machines, wire winding machines and similar high speed tools have been journaled in this manner. The drawback of spherical cap bearings lies in the fact that they act in only one direction and consequently with the use of only one bearing per shaft, the shaft must be vertical and have a gravitational axis which coincides with the axis of rotation. It is a further drawback that in the case vertical shafts are journaled, a neck or collar journal has to be provided in order to take up radial forces.

It is an object of the present invention to provide a new and improved axial/radial fluid dynamic cap bearing.

It is a further object of the present invention to provide a spherical cap bearing which may effectively serve as an axial bearing no matter in which direction or attitude the shaft journaled therein is arranged.

It is a further object of the present invention to provide the known unilaterally acting axial bearings and in particular a spiral groove cap bearing so that forces acting along the axis from both directions can be taken by it so that the bearing is effective at both sides.

The foregoing objects, other objects, and numerous advantages of the present invention will become apparent from the following description of the invention itself.

SUMMARY OF THE INVENTION

According to the present invention a system is provided for journaling high speed rotary shafts adapted to carry rotors, centrifugers, spindles and the like comprising a spherical cap bearing adapted to receive an end of the shaft. Magnetic means are arrayed in the vicinity of the cap bearing so as to exert a force in the direction of the cap bearing. The shaft is provided with attractive means influenced by the magnetic force so as to draw the shaft axially into the spherical cap bearing. Preferably the end of the shaft is made or covered with magnetic or magnetizable means such as metal or comprises a magnet itself. Furthermore, the spherical cap bearing is preferably provided with a spiral groove and means for producing an aerodynamic and/or hydrodynamic bearing film between its surface and the surface of the end of the shaft.

In this way a compressing force acting in an axial direction on the spherical cap bearing is produced which, independently of the angular position of the shaft in space, makes the axial spherical cap bearing which normally has a unidirectional or one-sided action a bearing that now acts bidirectionally and in both directions. With the use of a ballcap or spherical cap bearing the magnetic forces moreover make effective a radial guiding of the shaft in the cap of the bearing so that angular deflection or inclination of the shaft resulting in a radial thrust component can also be more effectively borne. Thus in many cases a second bearing such as a neck or collar bearing taking up the radial forces, can be dispensed with altogether. The present invention may take many forms. In one particularly advantageous form, the magnets creating the force are arranged on the side facing away from the spherical cap bearing (i.e. behind the bearing) and substantially along the axis of rotation of the shaft. In this way, the shaft is drawn substantially along the axis of rotation and is thus particularly stabilized in the radial direction. In another form of the invention it may be advantageous to provide the rotating end of the shaft with an annular or circumferential extension over the diameter of the cap bearing on which the magnetic attractive means are provided. Simultaneously the magnetic means are arranged stationarily or in fixed position about the spherical bearing so that these parts exert a force on the shaft in the direction of the cap bearing. As desired the end of the shaft can take the constructional form, for instance, of a solid disc or a dish with a flat peripheral edge. The attractive means may themselves be magnets exerting a force field in conjunction with the stationary magnets arranged about the spherical cap bearing. According to the position of the stationary magnets in relation to those at the end of the rotatable shaft, and their polarity, the compressive force of the shaft on the spherical cap bearing itself can be applied either as an attractive force or a repellent force. In any event the forces act axially with respect to the shaft and bearing. In still another form of the invention the shaft may be arranged upright or along a vertical axis and extends over and grips the spherical cap bearing under a substantial gravitational pull. The end of the vertical shaft may be provided with the opposing magnet and attractive means.

A very advantageous effect of the present invention arises from the construction of the spherical bearing itself. The spherical bearing may be mounted at its base by means of a spring and/or an elastic cushion so that it is resilient under the action of the axial loads placed on it.

Full details of the present invention are set forth in the following description and are shown in the accompanying drawings.

BRIEF DESCRIPTION OF THE DRAWINGS

In the drawings:

FIG. 1 is a schematic view of a rotating horizontal shaft journaled in accordance with the present invention, FIG. 2 shows a vertically suspended shaft journaled in accordance with the present invention, FIG. 3 shows a horizontally disposed shaft journaled in accordance with the present invention employing repelling magnets rather than attractive magnets.

FIG. 7 is a plan view of the cap bearing showing the flutes providing a dynamic bearing film.

DESCRIPTION OF THE INVENTION

Figure 4:
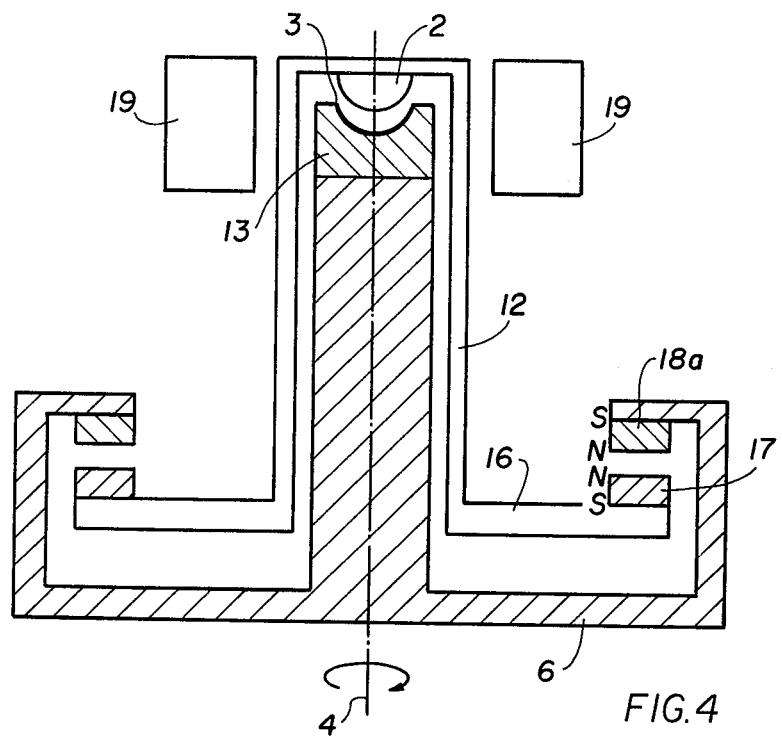
FIG. 4 shows the application of the present invention to motor shafts and rotors.

In the form of the invention shown in FIG. 1 a horizontal shaft 1 is supported on both sides in an axial direction as well as a radial direction with its end 2 in a spiral groove cap bearing 3. The spiral groove cap bearing comprises a cup shaped member in which flutes or a spiral groove is formed which is provided either with a hydraulic or aerodynamic medium which provides a fluid compressive bearing film between the end of the rotating shaft and the cup seat. As seen in FIG. 7, the cup seat 30 of the cap bearing 3 is provided iwth a plurality of flutes or grooves 31 which are preferably uniformly arranged about the center and radiate spirally outward. A single spiral groove or other configuration may also be employed. The cap bearing is adapted to support the shaft against the axial movement in the direction of the bearing, as well as radial movement transverse thereto. Behind the cap bearing 3 (that is on the side facing away from the cup) there is arranged along the axis of rotation 4 of the shaft 1 a magnet 5. The magnet 5 may be a permanent magnet or an electromagnet which is adapted to create a magnetic field acting on the shaft 2 so as to draw it into the cup of the spherical cap bearing 3. The shaft itself may be made of magnetic or magnetizable material, although it is preferred that only the end 2 of the shaft 1 need be made of such material. With the use of an electromagnet, the attractive force exerted on the shaft 1 in opposition to the supporting force of the bearing, which in dynamic bearings depends upon the speed of rotation, can be modulated and compensated for by well known electronic circuitry. The shaft 1 itself can be held in its horizontal position by means of additional radial bearings 23, which themselves may be active or passive magnetic bearings. At the normal working speed of rotation, the forward end of the shaft 2 is seated within the cap bearing 3 and is in contact only with the film of lubricant or air created therein. The spherical cap bearing is securely fixed within an outer housing or casing 6 and the film of lubricant or air dampens the transmission of vibration between the shaft 1 and the housing 6.

In general it is of advantage that the magnetic field generated by the magnet means 5 is rotationally symmetrical in relation to the axis of rotation 4 of the shaft 1. In this manner no eddy current losses can occur. As seen in FIG. 1 this is obtained by utilizing as the magnet 5 a magnet the circular magnetic field of which being symmetrical magnetized and axially aligned along the axis of rotation 4, the polarity designation being shown for convenience only. FIG. 1 further illustrates the advantage of employing an electromagnet. The axial attractive force of the magnet 5 can be regulated by means of a regulating device, generally depicted by the numeral 7. The regulating device 7 consists of a receiving sensor 8 adapted to sense for example the speed of rotation of the shaft 1. The sensor 8 is aligned with a perforated disc 9 fixed to the shaft 1. The sensor may either be a sonic sensor or a photoelectric sensor. The sensor 8 reacts to the passage of the perforated disc 9 and in response thereto produces a signal indicative of the speed of rotation of the shaft 1. This signal is forwarded to a control and comparison circuit 10 which is adapted to regulate the flow of current into the coil 11 surrounding the magnet 5 and to increase or decrease the current thereto in dependence upon changes in the speed of rotation of the shaft 1. In this manner greater or lesser degree of magnetic field can be created acting upon the shaft 1 and drawing it into the cup bearing 3. The control circuit 10 may be of any suitable type of known amplifiers.

Furthermore, the use of the sensor 8 can be made to measure the axial position of the shaft and/or its deflection from the true axis of rotation 4. The sensor can be made to sense the distance between it and the disc 9 as well as the angular deflection of the disc caused by the inclination or deflection of the shaft 1. In dependence upon such changes the sensor 8 can produce a similar signal controlling the flow of current into the coil 11. It is possible therefore, through the use of the regulating device 7 to maintain a suitable lubricating or air film thickness within the spiral grooves of the cap bearing even in the event of major variations in the axial or radial load upon the shaft.

As noted the spherical cap bearing can be of the aerodynamic or hydrodynamic type, although preferably the hydrodynamic type employing a lubricant such as oil of suitable nature is preferred. In particular cases it is possible that in the initial or starting-up phase, the film of lubricant within the bearing would be insufficient to provide suitable bearing seat. In this event it is possible, by means of the use of the regulating device 7 and particularly the function of the sensor 8 as an axial position sensor, to control an additionally arranged aero or hydrostatic bearing, for the shaft 1 to insure a contact free seating of the shaft 1 in relation to the cup bearing 3. Once a suitable lubricating or aerodynamic bearing film is obtained in the cup bearing 3 the additional bearing may be dispensed with. Furthermore, the sensor 8 can be used for measuring the axial load of the spiral grooved cap bearing 3 and to act across the circuit 10 upon the coil 11 to influence the strength of the magnet 5. As is clearly apparent from FIG. 1, the use of a spherical cap bearing allows the rotor to be installed and assembled so as to have a given degree of inclination which is variable within predetermined limits. Allowing the shaft 1 to have a degree of variance is of great significance in high speed rotors since it reduces the problems of initial installation and assembly (problems relating to flush fit and alignment for example).

In FIG. 2 the present invention is shown applied to a shaft 1 on which there is carried a rotor 12. The shaft and rotor 12 are suspended beneath the cap bearing and have a vertical axis of rotation 4 the upper end 2 of which is seated within the cap bearing 3. The shaft 1 and rotor 12 are under the influence of gravitational forces and are attracted into the cap bearing 3 by the magnetic force applied by the magnet 5. The magnet 5 is similar to that shown in FIG. 1 in that it comprises a magnet arranged axially along the axis of rotation. The magnet 5 may be either a permanent magnet and/or an electromagnet functioning as in the embodiment of FIG. 1. In addition in the embodiment seen in FIG. 2 the spherical cap bearing is secured in the housing 6 by a cushion 13. The cushion can comprise for instance rubber or plastic pad. The cushion may also be formed of a spring bellows, or other spring means suitably capable of resiliently supporting the spherical cap bearing. The cushion 13 serves to prevent the transmission of vibrations from the rotor 12 to the housing 6 and similarly the transmission of shock and vibrations from the housing 6 to the rotor 12. Furthermore, the cushion 13 reduces the radial bearing stresses caused by the imbalance of the rotor 12, which no matter how much care is taken in the formation of the rotor 12 are always present. As a result the spiral grooved cap bearing 3 has an increased life and does not require frequent replacement. Furthermore, the cushion 13 enables the shaft 1 and the rotor 12 to rotate approximately about the axis of its own axial moment of inertia, which moment deviates from the geometric rotation axis 4 in the event the rotor or shaft is in imbalance.

In the embodiment of FIG. 2 the attractive force of the magnet 5 must be greater than the dead weight of the rotor 12 so that the rotor does not drop out of the spherical cap bearing 3 due to the pull of gravitation. This force can be produced preferably by either using a permanent magnet of high strength or a corresponding electromagnet. In this embodiment the end of the shaft 2 also comprises a magnetic means or is made of magnetizable material. The rotor bearing shown in FIG. 2 has the advantage that at high speeds, the rotor, due to the geometric arrangement and its gyrostatic or gyroscopic properties, and with suitable choice of the moment of inertia, will rotate in a stable, defined position although it does not have an effective radial bearing at its lower end, i.e. rotor 12. Interfering forces during the course of operation may lead the rotor 12 to perform unwanted precessional movements. These movements can be easily dampened by means of a dampening device which consists of a position sensing receiver 8, a circuit 10 and an electromagnet 14. The sensor 8 can be an eddy current pick up, a photocell or the like producing a signal depending on the movement of the rotor 12. In this instance, the electromagnet 14 produces on the rotor a corrective phase magnetic radial attractive force, whose value and time curve are determined by the position information received by the sensor 8. The surface 15 of the rotor 12 lying in opposition to the electromagnet 14 must at the same time consist of magnetizable or magnetic material.

FIG. 3 depicts a further example of the present invention as applied to a bearing for a horizontal shaft 1 also journaled in a spiral groove cap bearing 3. Here, a member 16 is secured to the shaft 1 behind its end 2 and protrudes in a radial direction beyond the diameter of the cap bearing 3. The member 16 carries at its ends a magnet 17. Opposite this magnet 17 there is arranged a magnet 18a attached to the housing 6. The magnets 17 and 18a have a polarity such that they normally repel one another. As noted the housing 6 may be rectangular in section and the magnets 18a are formed on the shaft side, that is on the side opposite the bearing 3. Thus, the shaft end 2 is forced into the spherical cap 3, the magnetic field being produced axially along the shaft 1. With this arrangement there is also obtained a rigidity which in many cases is considerable, in relation to the tilting or inclination of the axis of the shaft 1 so that a second radial bearing such as bearing 23 shown in FIG. 1 can be dispensed with. To increase the axial force on the shaft 1 a second magnet 18b can be provided arranged about the bearing shaft 3, as shown in the dotted lines of FIG. 3. The magnet 18b is provided with a polarity such that the magnets 17 and 18b attract one another. In this way the magnet 18b is supplemental to the magnet 18a and further forces the end 2 of the shaft 1 into the cap bearing 3. The magnets 17, 18a and 18b are annular magnets having their polarity extending parallel to the axis of rotation as indicated in FIG. 3. The polarity denominations shown in FIG. 3 are for illustration only. The magnets are of course coaxially arranged about the shaft 1.

In FIG. 4 an arrangement is shown for journaling an upright rotor 12. As seen the spherical cap bearing is mounted at the upper end of a vertical post or standard secured to the housing 6 and the rotor 12 is provided with a shaft end 2 which sits within the bearing 3 normally under the force of gravity. Extending radially outwardly from the lower end of the rotor 12 is an annular disc or dish 16 which carries on its upper face an annular magnet 17. The housing 6 is again formed so that it has a portion overlying the discs or dish 16 and is provided with an annular opposing magnet 18a arranged in axial alignment with the magnet 17. The magnets 17 and 18a as seen in FIG. 4, are preferably rotationally symmetrical and have an axial polarity such that they repel one another and thus force the end of the shaft into the cap bearing 3. The rotor 12 is driven without contact by means of a stator 19 arranged about the upper end of the rotor. The rotor 12 may thus serve simultaneously as the armature of an electric motor. While the arrangement of FIG. 4 is shown in the vertical position this position is not necessary and the arrangement shown is not confined to a vertical axis of rotation. This is so because of the repellences of the magnets 17 and 18a as well as of the position of the stator 19 will enable the rotor 12 to be arranged in other than vertical positions. A cushion 13 for the spherical cap bearing may also be provided.

Figure 5:
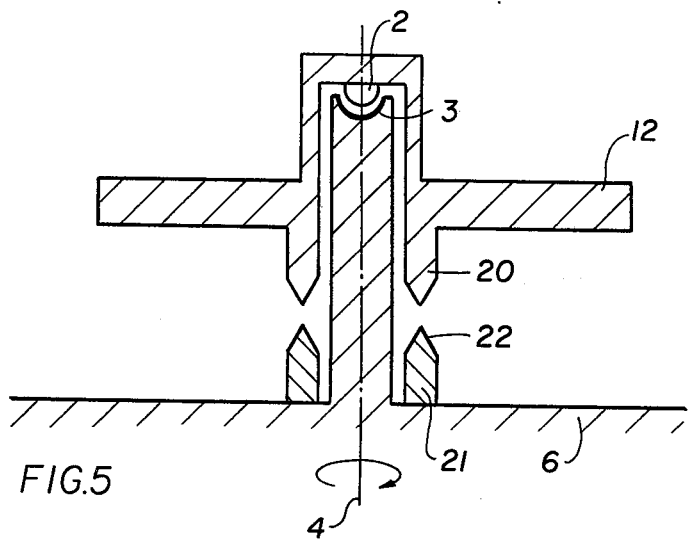
FIGS. 5 and 6 show a further embodiment of the present invention adapted if radial forces shall be borne by the magnetic of the bearing.

FIG. 5 shows an arrangement basically similar to that of FIG. 4 employing an upright rotor 12 and a shaft end 2 which sits within the spherical bearing 3 normally under the gravitational force. The shaft itself comprises the hub for the rotor 12 which is a hollow cylinder fitting over the post or standard of the housing 6. In the embodiment of FIG. 5 a tapering rotationally symmetrical or annular magnetic pole shoe 20 depends from the rotor 12 in opposition to an attractive magnet 21. The attractive magnet 21 is also rotationally symmetrical or annular and is provided at its upper edge with a tapering pole shoe 22. Through this design of the pole shoes, in addition to the axially directed attractive forces parallel to the axis of rotation 4, a high radial guiding force is attained. The magnet 21 may be a permanent and/or electrical magnet of the type described earlier. The embodiment shown in FIG. 5 avoids the need for additional radial bearings 23 since through the design of the pole shoes a high radial guidig force is obtained.

Figure 6:
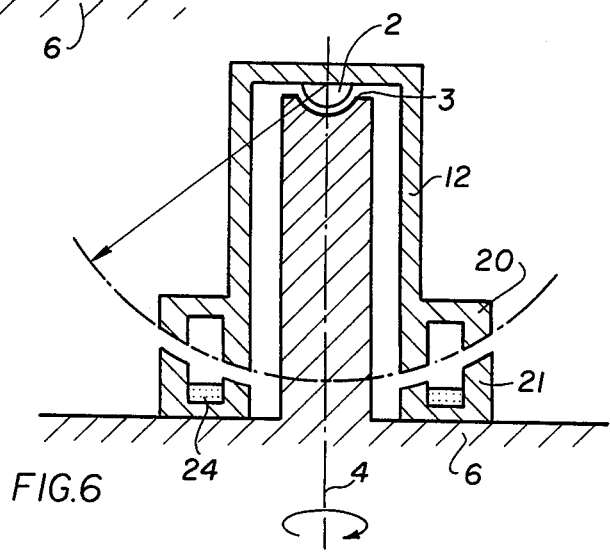

An advantageous arrangement is shown in FIG. 6 wherein several rotationally symmetrical or annular pole shoes are located concentrically one inside the other. Here the fixed or stationary magnet 21 takes the form of an electromagnet with an exciter or coil winding 24 located between two vertical or upwardly extending arms. Permanent magnets can be used with equal advantage. The pole shoe 20 integral with the end of the rotor 12 is likewise provided with a pair of concentric rings located in axial opposition or alignment with the upstanding arms of the fixed magnet 21. In this form the magnetic flux closes or circuits via the rotor pole shoe 20 so that only small air gaps have to be bridged between the pole shoe rings. It is possible to provide a particularly small pole gap between the rings of the pole shoe 20 and the fixed pole shoe 21 by forming their edges to lie complimentary to each other on a spherical surface whose center coincides with the pendulum fulcrum of the shaft end 2 as it seats within the spherical bearing cap 3. The spherical surface is illustrated by the dot-dash line and the radius by the arrow as seen in FIG. 6. In this situation, even with large angles of inclination of the rotor axis, mechanical contact of the opposing pole shoes is reliably precluded.

It will be clearly recognized that the rotating shaft in FIGS. 4, 5 and 6 is that portion of the rotor 12 which depends about the vertically upstanding supporting post and that in each of these embodiments, the shaft and rotor can take both axial and radial movement as well as pendulus movement about the shaft end 2. It will also be recognized that in all of the embodiments a spherical cap bearing is provided which is adapted to receive an end of the shaft. The magnetic means are arrayed in the vicinity of the cap bearing and on either side of it in order to exert a force axially of the shaft and in the direction of the cap bearing. The shaft is provided with means which are either magnets themselves or of magnetic material adapted to be attracted by the magnets arrayed about the cap bearing whereby the end of the shaft is thus drawn into the spherical cap bearing.

Various embodiments have been shown, other embodiments, changes and modifications will be obvious to those skilled in the present art. It is therefore intended that this disclosure be taken as illustrative only of the present invention and not limiting of its scope.

What is claimed is:

1. A system for journalling high speed rotary shafts comprising a spherical cap bearing fixedly mounted with respect to the shaft adapted to receive an end of said shaft, and to support said shaft against axial movement in the direction of said bearing, magnetic means arrayed with respect to said cap bearing to exert a continual force axially on said shaft toward the bearing means associated with said shaft cooperative with said magnetic means to move said shaft toward said spherical cap bearing during rotation and said cap bearing formed with at least one groove on its surface for forming a dynamic bearing film between the cap bearing and the shaft during rotation of said shaft.

2. The system according to claim 1 wherein the spherical cap bearing is provided with spiral grooves which create the dynamic bearing film therein during rotation.

3. The system according to claim 1 wherein said magnet means comprises a permanent magent.

4. The system according to claim 1 wherein said magent means comprises an electromagnet.

5. The system according to claim 4 including means for varying the strength of said magnetic force created by said electromagnet.

6. The system according to claim 5 wherein the means for varying the strength of said electromagnetic force is responsive to variations in movement of said shaft.

7. The system according to claim 6 wherein said means for varying the strength of said magnetic force includes a sensor responsive to the rotation of said shaft.

8. The system according to claim 6 wherein the means for varying the strength of said magnetic force includes a sensor responsive to the deflection and/or axial position of said shaft.

9. The system according to claim 1 wherein said magnet is arrayed behind said spherical cap bearing substantially along the axis of rotation of the shaft.

10. The system according to claim 1 wherein said magnet means comprises a magnet fixedly arranged coaxially about said spherical cap and said means cooperative with said magnetic means said coaxially arranged. magnet.

11. The system according to claim 10 wherein the coaxially arranged magnet extends in radial direction over the diameter of the cap bearing.

12. The system comprising a fixedly mounted spherical cap bearing and a shaft journalled therein, said shaft and said spherical cap bearing being disposed generally in an upright condition, said shaft being disposed over said spherical cap bearing and being provided with magnet means at its end opposite said spherical cap bearing, said spherical cap bearing being provided with cooperating magnet means to draw said shaft continually toward said spherical cap bearing and said cap bearing having at least one groove on its surface to form a dynamic fluid bearing for said shaft.

13. The system according to claim 1 including means for resiliently cushioning the cap bearing so as to absorb axial and radial loads.

14. The system according to claim 12 wherein said magnet means have an inhomogenious field which produces stabilizing radial guiding forces when the shaft is not in proper alignment with the axis of rotation.

15. The system according to claim 12 wherein said magnet means are rotationally symmetrical and are provided at its upper edge with tapering pole shoes.

16. The system according to claim 12 wherein said magnet means are provided with at least two pairs of concentric pole shoes located in axial opposition to each other, so that the magnetic flux is closed over the gap between these pole shoes.

* * * * *